(12) United States Patent
Neuvirth et al.

(10) Patent No.: US 11,405,413 B2
(45) Date of Patent: Aug. 2, 2022

(54) ANOMALY LOOKUP FOR CYBER SECURITY HUNTING

(71) Applicant: MICROSOFT TECHNOLOGY LICENSING, LLC, Redmond, WA (US)

(72) Inventors: Hani Hana Neuvirth, Redmond, WA (US); Gueorgui Chkodrov, Redmond, WA (US); Dotan Patrich, Kfar Saba (IL); Elad Yom-Tov, Hoshaya (IL); Dawn Antonette Burns, Lynnwood, WA (US); Yotam Livny, Gadera (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 16/265,742

(22) Filed: Feb. 1, 2019

(65) Prior Publication Data

US 2020/0252417 A1 Aug. 6, 2020

(51) Int. Cl.
*H04L 9/40* (2022.01)
*G06F 16/901* (2019.01)
*H04L 41/069* (2022.01)

(52) U.S. Cl.
CPC ...... *H04L 63/1425* (2013.01); *G06F 16/9017* (2019.01); *H04L 41/069* (2013.01); *H04L 63/1441* (2013.01); *H04L 63/20* (2013.01)

(58) Field of Classification Search
CPC .............. G06F 16/9017; H04L 41/069; H04L 63/1425; H04L 63/1441; H04L 63/20
See application file for complete search history.

(56) References Cited

U.S. PATENT DOCUMENTS

| | | | |
|---|---|---|---|
| 7,363,656 B2* | 4/2008 | Weber | H04L 63/1425 709/223 |
| 8,245,294 B1* | 8/2012 | Zahra | H04L 63/14 726/22 |
| 8,495,429 B2* | 7/2013 | Fu | G06F 11/3608 714/38.1 |
| 8,779,921 B1 | 7/2014 | Curtiss | |
| 9,043,922 B1 | 5/2015 | Dumitras et al. | |
| 9,407,651 B2* | 8/2016 | Mathis | H04L 41/145 |

(Continued)

OTHER PUBLICATIONS

Hendry, et al., "Intrusion Signature Creation via Clustering Anomalies", In Proceedings of Data Mining, Intrusion Detection, Information Assurance, and Data Networks Security, vol. 6973, Mar. 17, 2008, 12 Pages.

(Continued)

*Primary Examiner* — Thomas J Dailey
(74) *Attorney, Agent, or Firm* — Workman Nydegger

(57) ABSTRACT

Performing anomaly lookup on data sources that include an entity related to an alert. One or more entities related to an alert and a date when the alert occurred are received. The alert may indicate that an anomaly in data collected from a various data sources may be present in at least one of the data sources. The various data sources are searched for the one or more entities around the alert date to determine which of the data sources include the one or more entities. For those data sources including the one or more entities, an anomaly lookup procedure is performed on the data sources during a first time window to determine an initial set of suspicious anomalies.

20 Claims, 7 Drawing Sheets

(56) References Cited

U.S. PATENT DOCUMENTS

| | | |
|---|---|---|
| 9,516,053 B1 | 12/2016 | Muddu et al. |
| 9,654,485 B1 | 5/2017 | Neumann |
| 10,140,576 B2 | 11/2018 | Eldardiry et al. |
| 10,601,844 B2 * | 3/2020 | Parker ................... H04L 63/107 |
| 10,673,880 B1 * | 6/2020 | Pratt ................... H04L 63/1433 |
| 2003/0110398 A1 | 6/2003 | Dacier et al. |
| 2004/0193943 A1 | 9/2004 | Angelino et al. |
| 2006/0018466 A1 | 1/2006 | Adelstein et al. |
| 2010/0071061 A1 * | 3/2010 | Crovella ............. H04L 63/1425 |
| | | 709/224 |
| 2010/0125663 A1 | 5/2010 | Donovan et al. |
| 2015/0256554 A1 | 9/2015 | Sakakibara et al. |
| 2015/0304349 A1 * | 10/2015 | Bernstein ............ H04L 63/1425 |
| | | 726/22 |
| 2017/0093902 A1 * | 3/2017 | Roundy ................. G06F 21/554 |
| 2017/0234435 A1 | 8/2017 | Hermann et al. |
| 2018/0004948 A1 | 1/2018 | Martin et al. |
| 2019/0207976 A1 | 7/2019 | Yadav et al. |
| 2021/0044606 A1 | 2/2021 | Neuvirth et al. |
| 2022/0030019 A1 | 1/2022 | Neuvirth et al. |

OTHER PUBLICATIONS

"International Search Report and Written Opinion Issued in PCT Application No. PCT/US2020/037350", dated Sep. 14, 2020, 13 Pages.
"International Search Report and Written Opinion Issued in PCT Application No. PCT/US2020/014534", dated Apr. 3, 2020, 24 Pages.
"Non Final Office Action Issued in U.S. Appl. No. 16/536,201", dated Aug. 4, 2021, 12 Pages.
"International Search Report and Written Opinion Issued in PCT Application No. PCT/US21/029519", dated Dec. 8, 2021, 10 Pages.

* cited by examiner

```
let indDate = datetime(2018-10-02); // the alert detection date        — 410
<tableName>
| extend ingestion_time()
| where $IngestionTime > indDate -1d and $IngestionTime < indDate + 1d  — 420
| search "username" // the entity to search for     — 430
| take 1
| count
```

*FIG. 4*

```
execute: tweet| tweet| tweet| tweet| tweet| tweet| tweet(SAM) https://cojoc.kusto.windows.net:443/88fc
let indDate = datetime(2019.10.02);   ← 530
let allDates = print(range(indDate -7d, indDate ,1d))
| mvexpand TimeCreated=print_0
| project todatetime(TimeCreated);    ← 510
let dailyCounts = materialize(        ← 520
SecurityEvent
| where TimeCreated > indDate -7d and TimeCreated < indDate + 1d   ← 540
| where Computer == "computername"
| summarize count() by bin(TimeCreated, 1d), EventId
);
let allDatesEvents = allDates | extend crossJoinDummyId=1
| join kind = fullouter (
  dailyCounts | summarize by EventId | extend crossJoinDummyId=1
) on crossJoinDummyId
| project-away crossJoinDummyId, crossJoinDummyId1;
let fullDailyCount = allDatesEvents
| join kind = leftouter (
  dailyCounts
) on TimeCreated, EventId
| project TimeCreated, EventId, count_ = iff(isempty(count_), 0, count_);
fullDailyCount
| where TimeCreated < indDate
| summarize befAvg=avg(count_), befStd=stdev(count_) by EventId
| join kind= rightouter (
  fullDailyCount
  | where TimeCreated >= indDate
  | summarize aftAvg=avg(count_) by EventId
) on EventId
| extend dist=iff(isempty(befAvg ),1.0,iff(befStd == 0,iff(befAvg == aftAvg,0.0,1.0/0),(aftAvg-
befAvg)/befStd))
| where dist > 2
```

| EventId | befAvg | befStd | EventId1 | aftAvg | dist |
|---|---|---|---|---|---|
| 4740 | 0.571428571428571 | 0.534522483301486 | 4740 | 2 | 2.67261241919106 |
| 4771 | 45.4901714285714 | 20974.0103041382 | 4771 | 140989 | 4.55317244196647 |
| 5139 | 0.714285714285714 | 1.49602648308778 | 5139 | 8 | 4.87043657710093 |

⎫
⎬ 550
⎭

The events that came up are
5139: A directory service object was moved
4771: Kerberos pre-authentication failed
4740: A user account was locked out

*FIG. 5*

ANOMALY LOOKUP FOR CYBER SECURITY HUNTING

BACKGROUND

Anomaly detection is often used to detect anomalies in various computing systems. In a typical scenario, an alert that is related to an entity of the computing such as a computer name or IP address and that indicates a potential anomaly is generated by the computing systems. In response, data sources that log information about the computing system are then subjected to anomaly detection to discover any anomalies and if they are of a malicious type.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, methods, and computer readable media for performing anomaly lookup on data sources that include an entity related to an alert. One or more entities related to an alert and a date when the alert occurred are received. The alert may indicate that an anomaly in data collected from a various data sources may be present in at least one of the data sources. The various data sources are searched for the one or more entities around the alert date to determine which of the data sources include the one or more entities. For those data sources including the one or more entities, an anomaly lookup procedure is performed on the data sources during a first time window to determine an initial set of suspicious anomalies.

Additional features and advantages will be set forth in the description which follows, and in part will be obvious from the description, or may be learned by the practice of the teachings herein. Features and advantages of the embodiments disclosed herein may be realized and obtained by means of the instruments and combinations particularly pointed out in the appended claims. Features of the embodiments disclosed herein will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates an example embodiment of the operation of a search module according to the embodiments disclosed herein;

FIG. 5 illustrates an example embodiment of an anomaly lookup procedure that utilizes different time windows according to the embodiments disclosed herein;

DETAILED DESCRIPTION

Figure 1:
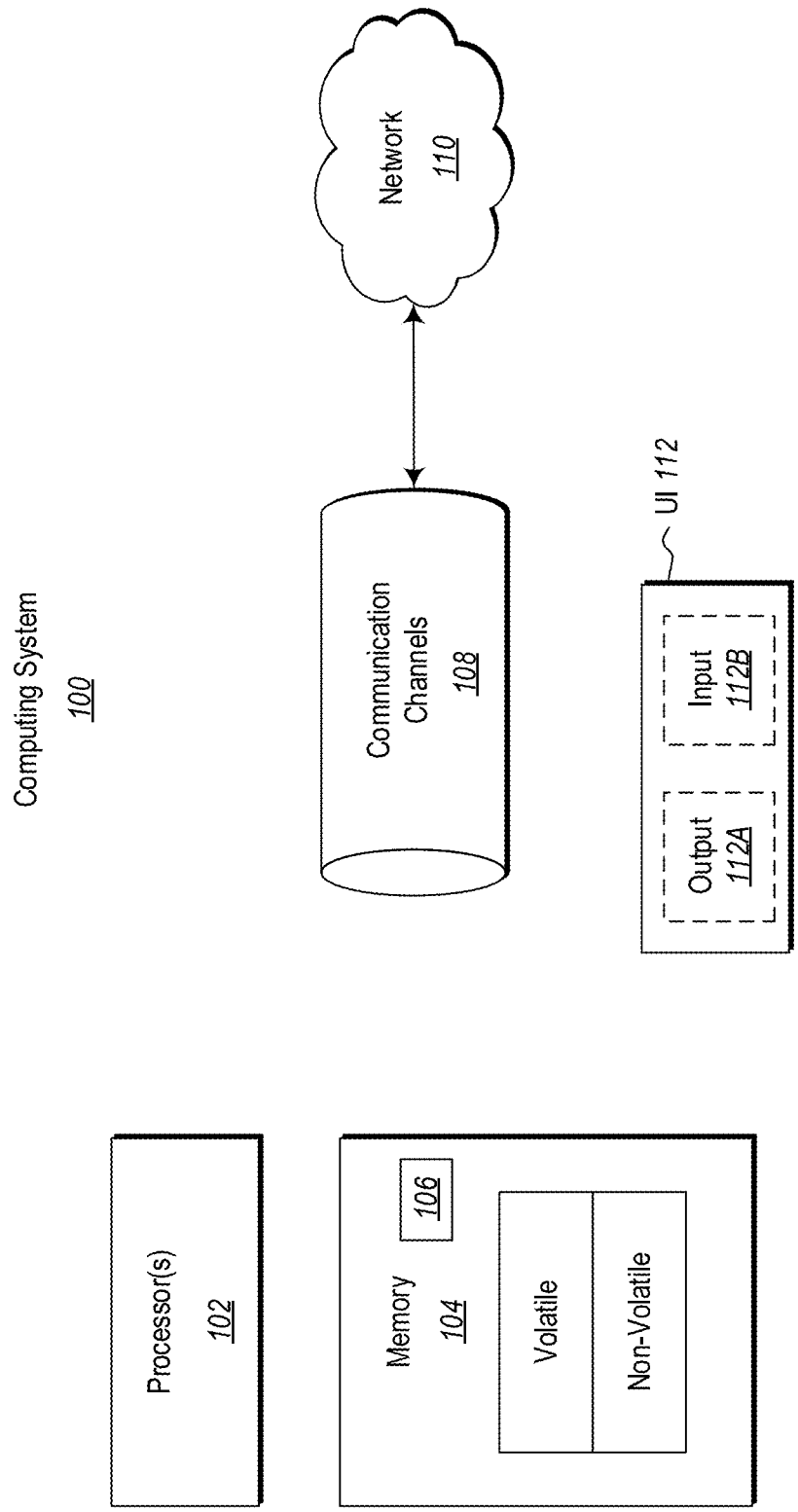
FIG. 1 illustrates an example computing system in which the principles described herein may be employed.

Anomaly lookup is often used to detect anomalies in various computing systems. In a typical scenario, an alert that is related to an entity of the computing such as a computer name or IP address and that indicates a potential anomaly is generated by the computing systems. In response, data sources that log information about the computing system are then subjected to anomaly lookup to discover any anomalies and if they are of a malicious type.

In many computing systems, a human user is needed to investigate the alert to determine if there are any of anomalies and if they are of the malicious type. This process can be time consuming if there are a large number of data sources to search when investigating the alert. This may also lead to an increased time for the anomaly lookup and an increased use of computing resources. In addition, it may also lead to an increased number of false positive lookup of anomalies.

The embodiments disclosed herein solve these problems by providing a lookup mechanism that looks up the potential anomalies in the data sources that are related to the entity of the alert. The lookup mechanism may then provide a "hint" as to the source or cause of the anomaly, which may greatly speed up the investigation of the alert. In addition, the lookup mechanism may be performed over one or more time windows that help to increase the accuracy of the procedure, thus potentially reducing the number of false positives.

The embodiments disclosed herein provide several technical advances over conventional systems. For example, embodiments disclosed herein provide for a way to reduce the number of data sources that are subjected to anomaly lookup. By only performing anomaly lookup on data sources that include or are otherwise associated with an entity included in the security alert, time and processing resources saved. In addition, the embodiments disclosed herein are able to work with numerous different types of anomaly detection algorithms and the like. Accordingly, the embodiments disclosed herein provide a generic way to apply various anomaly lookup algorithms and procedures in the investigation of potential malicious anomalies.

Because the principles described herein may be performed in the context of a computing system, some introductory discussion of a computing system will be described with respect to FIG. 1. Then, this description will return to the principles of the embodiments disclosed herein.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 100 previously described. The computing systems of the remaining figures may include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
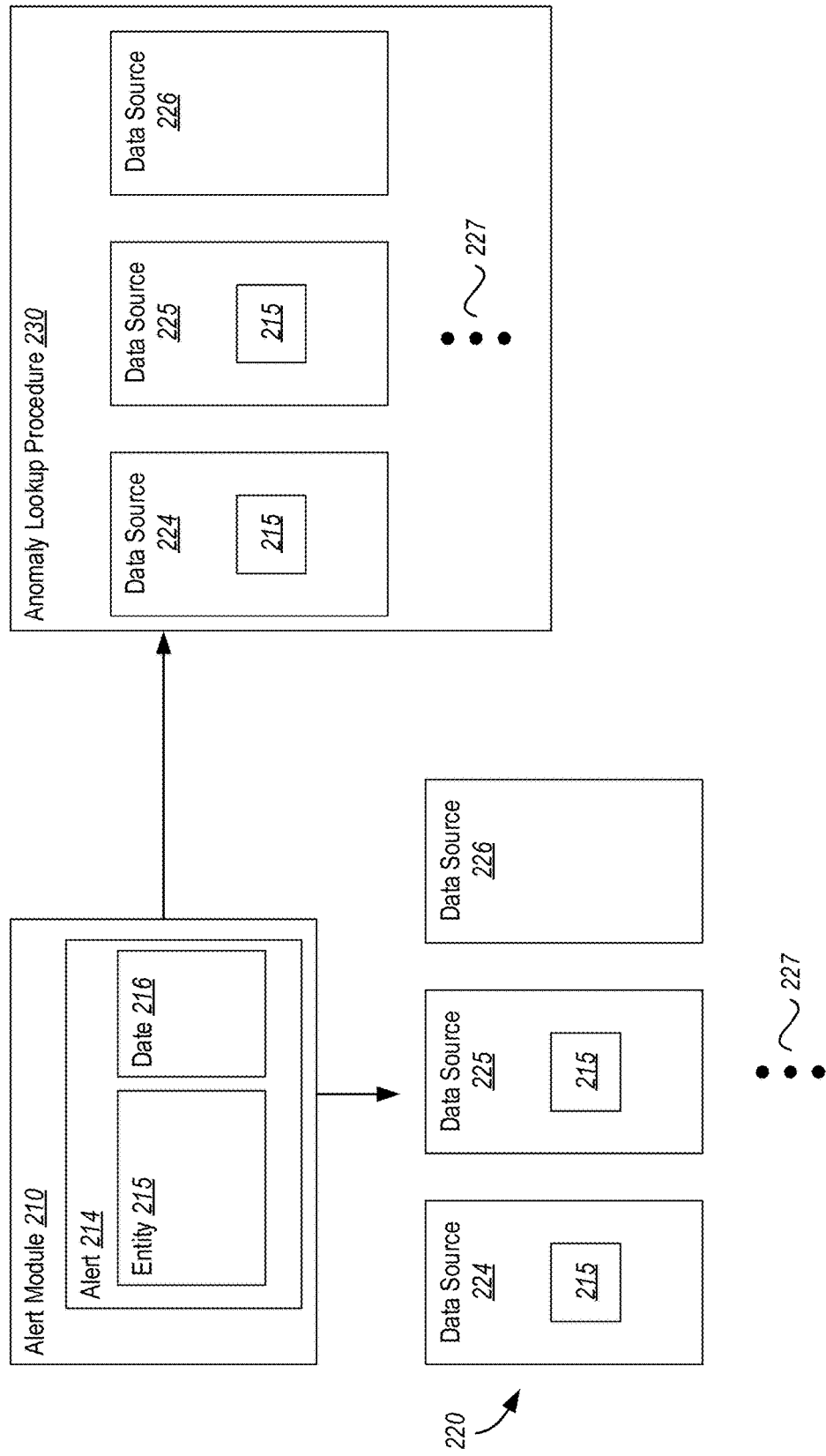
FIG. 2 illustrates an example environment for performing anomaly lookup in a computing system.

FIG. 2 illustrates an environment 200 of a computing system. As illustrated, environment 200 includes an alert module 210 and various data sources 220, including data source 224, 225, 226, and any number of additional data sources as illustrated by ellipses 227. In some embodiments, the data sources 220 may include, but is not limited to, logs from one or more of a specific computer, routers on a network, an application, an operating system, network infrastructure, and cloud computing infrastructure. That is, during operation various elements of a computing system such as individual computers and like devices, operating systems and applications running on the computers, network infrastructure such as routers and the like, and cloud computing infrastructure all generate logs of their operations. Of course, it will be appreciated that additional computing system elements may also generate logs as needed.

The alert module 210, which may be part of a computing system that is different from those hosting the various data sources, may be configured in operation to generate an alert 214 when an anomaly of some sort is detected in one or more of the data sources 220 or is detected in some other reasonable way known to those of skill in the art. An anomaly may include, but is not limited to, a random operational occurrence such as a power surge that is generally not malicious or may include malicious activity or the like on the computing system such as an attempt to overwhelm the security protections of the computing system. In any event, the anomaly may cause the alert module to generate the alert 214.

An entity 215 may be associated with the alert 214. The entity 215 may identify a source of the anomaly that caused the alert to be generated. For example, the entity 215 may be, but is not limited to, a machine or computer name, a user name, an IP address, or a network identifier that identifies the source of the anomaly. If the entity 215 is a machine or computer name or a user name, than this may specify that the anomaly was generated by or otherwise associated with that machine or computer or that specific user. Likewise, if the entity 215 is an IP address or a network identifier, than this may specify that the anomaly was generated by or otherwise associated with the specific IP address or network. Although only illustrated as including one entity 215, the alert 214 may include more than one entity 215 as circumstance warrant. A date 216 that may also include a time stamp that specifies the date and time of the anomaly may also be associated with the alert 214.

The environment 200 may include an anomaly lookup procedure 230. The anomaly lookup procedure 230 may be any reasonable anomaly lookup procedure such as various machine learning algorithms, timeline anomaly detection algorithms, and the like known to those of skill in the art that are able to detect anomalies in the data sources. In operation, the anomaly lookup procedure 230 may perform its given anomaly lookup on the data sources 220 to determine if the anomaly or additional anomalies associated with the entity 215 may have occurred in one or more of the data sources 220 around the date and time specified by the date 216. This information may then be used to initiate corrective actions if the detected anomalies are indicative of malicious activity or if it is otherwise deemed that corrective actions would be beneficial.

As shown in FIG. 2, the anomaly lookup procedure 230 performs its anomaly lookup on all of the data sources 220. However, as also shown, only the data sources 224 and 225 include data that includes or is otherwise associated with the entity 215. The data source 226 and any potential data sources 227 do not include data that is associated with the entity 215. Accordingly, the anomaly lookup procedure 230 may perform the anomaly lookup on many data sources that will not provide any information as to anomalies associated with the entity 215.

As may be appreciated, this results in the anomaly lookup taking a much longer time than needed as data sources that may not be relevant are analyzed. In addition, this may further result in a waste of processing resources. Advantageously, the embodiments disclosed herein provide for a way lower the anomaly lookup time and to preserve computing resources, while also providing a road map for further anomaly lookup and analysis.

Figure 3:
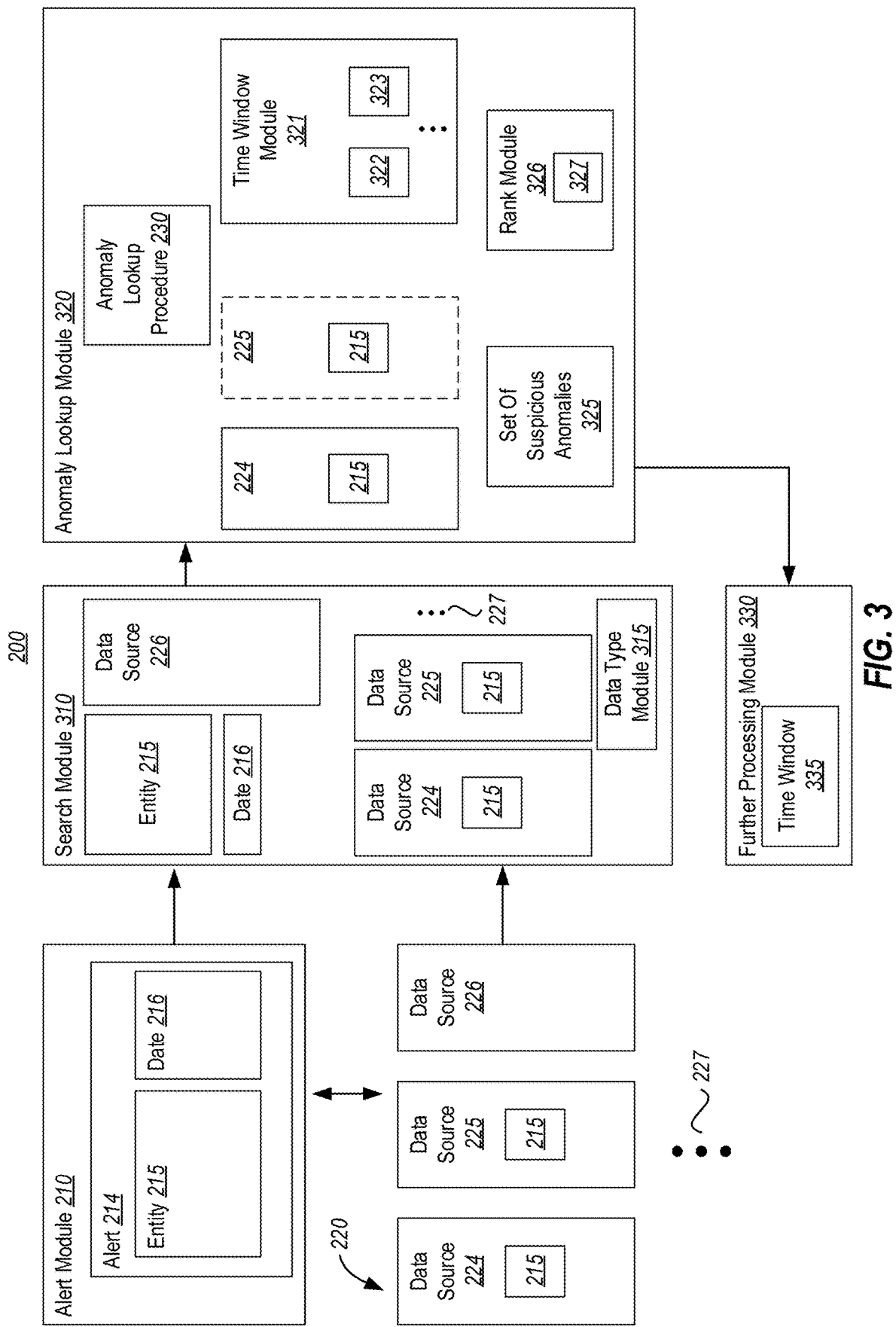
FIG. 3 illustrates an example environment for performing anomaly lookup according to the embodiments disclosed herein.

FIG. 3 illustrates an environment 300 in which the embodiments disclosed herein may be practiced. It will be noted that the environment 300 is only one of many possible environments and thus is not to be used to limit the embodiments disclosed herein.

As illustrated, environment 300 includes the alert module 210 and the alert 214 with its associated entity 2215 and date 216. In addition, environment 300 includes the various data sources 220 including data sources 224, 225, 226, and potentially any number of additional data sources represented by the ellipses 227. Accordingly, these elements need not be explained in further detail.

The environment 300 may include a search module 310. In operation, the search module 310 may receive or otherwise access the entity 215 and the date 216 from the alert 214. The search module 310 may also access the various data sources 220. The search module 310 may then search all of the data sources 220 to determine which of the data sources includes data that includes or is otherwise associated with the entity 215 that was logged around the date 216. In this way, the search module 310 is able to determine only those data sources that are associated with the entity 215 for further anomaly lookup procedures as will be explained in more detail to follow.

FIG. 4 illustrates a specific embodiment of the operation of the search module 310. As shown at 410, an alert date 216 of "2018-10-02" is used by search module 310 when searching the various data sources 220.

As shown at 420, the search module 310 is configured to perform its search around the alert date. In the illustrated embodiment, the search is performed one day before the alert date and one day after the alert date. It will be appreciated that the embodiments disclosed herein are not limited to any specific window of searching around the alert date. Thus, the search window may be more or less than what is illustrated in FIG. 4. For example, in some embodiments the search may be performed on only the alert date without any additional search window. Thus, in the illustrated embodiment the search may only have been performed on the alert date 216 of "2018-10-02" without the need to search a day before and after the alert date.

As shown at 430, the search is performed to determine data sources including or otherwise associated with the entity 215 "username". Accordingly, only those data sources 220 that include or are otherwise associated with the entity 215 "v-raonag" will be determined by the search module 320 to be relevant data sources that should be provided to the anomaly lookup procedure 230 for further anomaly lookup.

The environment 300 may further include an anomaly lookup module 320 that may include the anomaly lookup procedure 230 that performs anomaly lookup on the data sources 220. As illustrated in FIG. 3, only the data sources 224 and 225 that include or are otherwise associated with the entity 215 are provided to the anomaly lookup module 320 for anomaly lookup analysis by the anomaly lookup procedure 230. Accordingly, the embodiments disclosed herein eliminate the need for the anomaly lookup on those data sources 220 (i.e., data sources 226 and 227) that do not include the entity 215. This advantageously speeds up the anomaly lookup analysis and reduces the required computing resources needed.

During the anomaly lookup analysis, the anomaly lookup procedure 230 may perform anomaly lookup on the data sources 224 and 225 during a first time window to determine an initial set of suspicious anomalies. Accordingly, the anomaly lookup module 320 may include a time window module 321 that is able to specify a time window 322. In some embodiments, the time window 322 may be set to a relatively short period of time, such as a day or less, although any desired time period may be used as circumstances require. As may be appreciated, setting the time window 322 to a relatively short period of time allows the anomaly lookup to establish a baseline that can then be used to determine if the anomalies are regularly occurring, which may be indicative of a malicious anomaly, or are random occurrences that are indicative of a random, non-malicious anomaly.

The anomaly lookup procedure 230 may then determine an initial set of suspicious anomalies 325 found during the time window 322. In the embodiments disclosed herein, the term "suspicious" is used to indicate that the anomalies that are found are such that further analysis may be warranted to determine if they are malicious or not. Thus, the set of suspicious anomalies may ultimately be determined to be malicious or to be non-malicious as circumstances warrant.

In some embodiments, the anomaly lookup procedure 230 may also utilize an additional time window 323 that is specified by the time window module 320. In some embodiments, the time window 323 may be longer than the time window 322. This allows for a comparison between the anomalies found during the time window 322 with those found during the time window 321 when determining the initial set of suspicious anomalies 325.

A specific embodiment of an anomaly lookup procedure 230 that utilizes the time windows 322 and 323 will now be described in relation to FIG. 5. It will be appreciated that the embodiment of FIG. 5 is only one non-limiting example of an operation of an anomaly lookup procedure 230 and thus should not limit the embodiments disclosed herein. As shown at 510, a time window 322 of one day is selected and as shown at 520, a time window 323 of one week is selected. In addition, as shown at 530 an alert date 216 of "2018-10-02" is used as the basis of the anomaly lookup. Further, as shown at 540 an entity 215 which is a computer name is also used in the anomaly lookup.

During operation, the anomaly lookup procedure 230 analyzes the data sources 224 and 225 for various events associated with the computer name entity 215 that occurred on the alert date 216 of "2018-10-02". A count of such events is taken. Thus, the count is taken during the time window 322 of one day.

The anomaly lookup procedure 230 then analyzes the data sources 224 and 225 for various events associated with the computer name entity 215 that occurred the week (seven days) before the alert date 216 of "2018-10-02". A count of such events is also taken. Thus, the count is taken during the time window 323 of one week.

The anomaly lookup procedure may then make a comparison of the counts to determine which events stayed the same and which events changed. Any events that show a change may be indicative of an anomaly that occurred and so may be part of the initial set of suspicious anomalies 325. As shown at 550, in the illustrated embodiment event types 4740, 4771, and 5139 are determined to have differences in the count between the two time windows and thus may be included in the initial set of suspicious anomalies 325.

As mentioned previously, the anomaly lookup procedure 230 may be any type of reasonable anomaly lookup procedure including various types of machine learning algorithms, timeline anomaly detection algorithms, and the like known to those of skill in the art. Advantageously, the embodiments disclosed herein are able to work with all types of anomaly lookup procedures. That is, the search module 310 is able to search and determine those data sources 220 that include or are otherwise associated with the entity 215 without regard to the specific type of the anomaly lookup procedure 230.

In some embodiments, however, the anomaly lookup procedure 230 may be such that it is configured to use certain types of data. In other words, only certain types of data may be relevant to the anomaly lookup performed by the anomaly lookup procedure 230. For example, the anomaly lookup procedure 230 may be configured for categorical data, continuous data, or other types of data.

In some embodiments, the search module 310 may include a data type module 315. In operation, the data type module 315 may be configured to identify data sources 220 that include data including or otherwise associated with the entity 215 but that are also of the data type (i.e., for example categorical data or continuous data) that is useable by the anomaly lookup procedure 230.

For example, as previously described the data sources 224 and 225 include or otherwise associated with the entity 215. However, in FIG. 3 data source 225 is shown with dotted lines, which are used to illustrate that in the embodiments including the data type module 315, the data source 225 may not include data of a type that is useable by the anomaly lookup procedure 230. Accordingly, even though the data source 225 includes or is otherwise associated with the entity 215, because its data is not of a type useable by anomaly lookup procedure 230, anomaly lookup is not performed on the data source 225 in this embodiment.

In some embodiments, the anomaly lookup module 320 may include a rank module 326. In operation, the rank module 326 may be configured to generate a rank 327 for the initial set of suspicious anomalies 325. The rank 327 may be then used as a type of "triage" to help determine which of the anomalies in the initial set 325 should be further analyzed to determine if they are malicious or not. For example, those anomalies in the initial set 325 that appear more frequently may be indicative a malicious activity such as some sort of fraudulent attack or other security issue while those anomalies that appear less frequently may be indicative of a random non-malicious anomaly. Accordingly, the ranking 327 may help to prioritize further anomaly lookup resources as circumstances warrant.

In the embodiment of FIG. 5, the event 4471 has a much larger number of counts then do the other two events that were found to have anomalies. If this result were subjected to the ranking module 326, then the resulting ranking 327 would indicate that the anomalies associated with the event 4471 should be analyzed first as the large number may indicate a security issue or other malicious activity.

In some embodiments, further anomaly lookup analysis may be desired on the initial set of suspicious anomalies 325. Accordingly, in such embodiments the environment 300 may include a further processing module 330. Although shown as being separate, in some embodiments the further processing module 330 may be part of the anomaly lookup module 320.

In operation, the further processing module 330 may be configured to perform a "deep dive" on the initial set of suspicious anomalies 325 to determine additional information about the anomalies. In one embodiment, this may include having the anomaly lookup procedure 230 perform anomaly lookup over a longer time window than the time window 322 and the time window 323 in those embodiments that utilize the time window 323. Accordingly, the further processing module 330 may include a time window module (not illustrated) or have access to the time module 321 that is able to specify a time window 335. As mentioned, the time window 335 may be a longer time period than the time windows 322 and 323.

Figure 6:
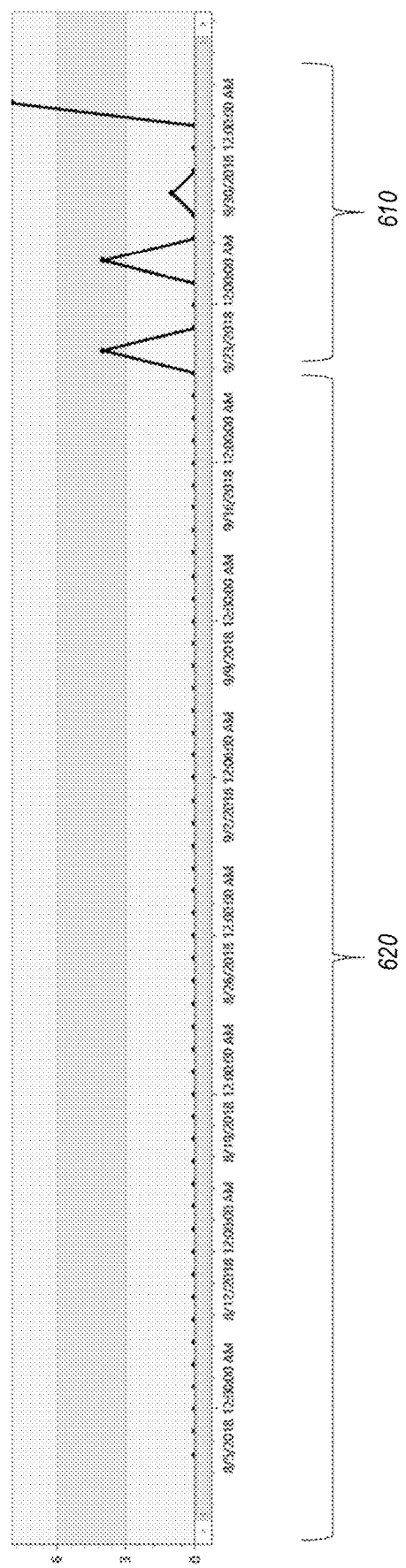
FIG. 6 illustrates an example embodiment of the operation of a further processing window according to the embodiments disclosed herein.

FIG. 6 illustrates a specific embodiment of the operation of the further processing window 330. As shown at 610, anomalies were detected between Sep. 23, 2018 and Sep. 30, 2018. This time period may represent anomaly lookup done during only the time window 322 or during both the time window 322 and 323 in the manner previously described. Since anomalies were detected, it may be desirable to do a deeper analysis to determine additional information about the anomalies such as how long the anomalies have been occurring.

Accordingly, the anomaly lookup procedure 230 may perform anomaly lookup over the time window 335. As shown at 620, the time window 335 may be from Aug. 5, 2018 to Sep. 16, 2018. In the embodiment, no anomalies are found during the time window 335. This may indicate that the anomalies found after Sep. 23, 2018 only began on that date. Further analysis could be performed if needed. For example, the time window 335 could be expanded to a longer time period to determine if the anomalies happened later back in time. All this information may be used to make determinations about whether the anomalies are indicative of malicious activity or not and what remedial actions are needed if the anomalies are malicious activity.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
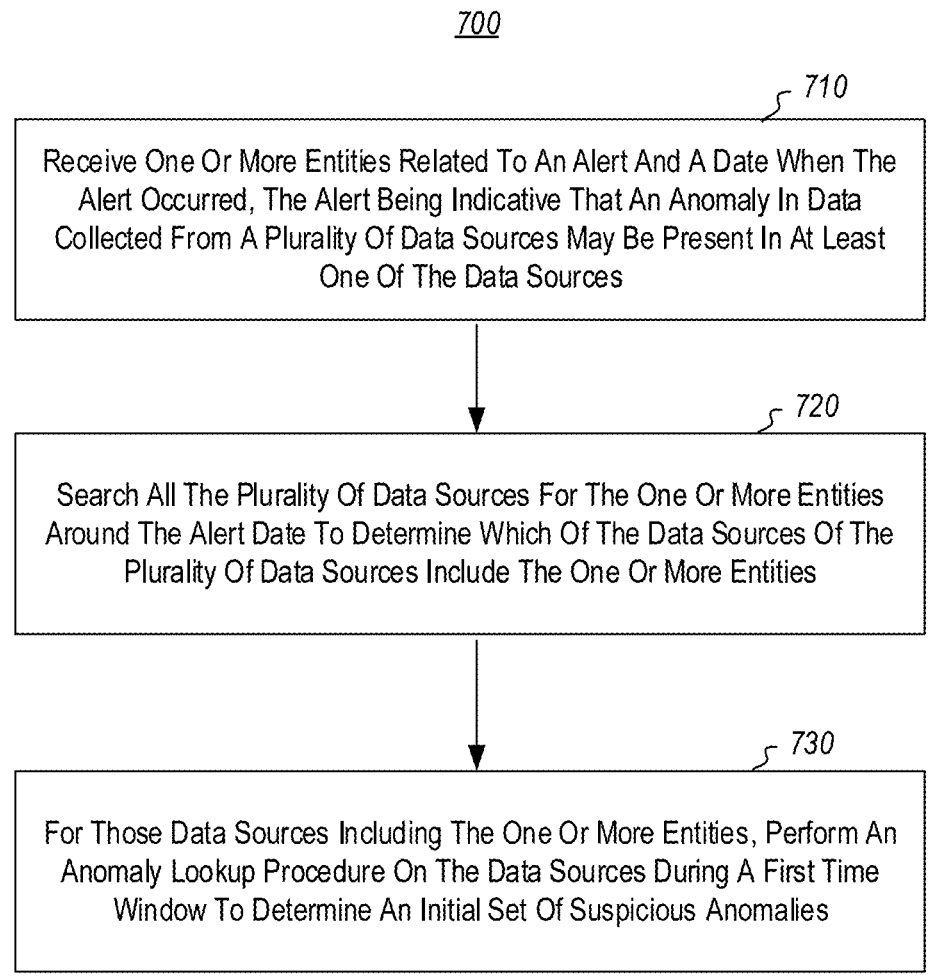
FIG. 7 illustrates a flow chart of an example method for performing anomaly lookup on data sources that include an entity related to an alert.

FIG. 7 illustrates a flow chart of an example method 700 for performing anomaly lookup on data sources that include an entity related to an alert. The method 700 will be described with respect to one or more of the figures discussed previously.

The method 700 includes receiving one or more entities related to an alert and a date the alert occurred, the alert being indicative that an anomaly in data collected from a plurality of data sources may be present in one of the data sources. For example, as previously described an alert 214 that includes the entity 215 and the date 216 is received by the search module 310. The alert is indicates that an anomaly may be present in at least one data source 220.

The method 700 includes searching all the plurality of data sources for the one or more entities around the alert date to determine which of the data sources of the plurality of data sources include the one or more entities (720). For example, as previously described the search module 310 may search the data sources 220 to determine that the data sources 224 and 225 include data that includes or is otherwise associated with the entity 215 and the date 216. The search module may also determine that data sources 226 and potentially 227 do not include the entity 215 and the date 216.

The method 700 includes, for those data sources including the one or more entities, performing an anomaly lookup procedure on the data sources during a first time window to determine an initial set of suspicious anomalies (730). For example, as previously described the anomaly lookup procedure 230 may perform anomaly lookup on the data sources 224 and 225 since they include or are otherwise associated with the entity 215. The anomaly lookup may occur during the time window 322. The anomaly lookup may result in the determination of the initial set of suspicious anomalies 325.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, cause the computing system to:
receive identifying information for a source that is related to an alert and receive a date when the alert occurred, wherein the alert is received by the computing system in response to an anomaly being detected within data collected from a plurality of data sources;
search all of the plurality of data sources in an attempt to identify said source, wherein the search is limited based on the alert date;
as a part of said search, identify a subset of one or more data sources from among the plurality of data sources, wherein the one or more data sources within the subset are identified based on a determination that the one or more data sources in the subset do include the source;
for only the subset of the one or more data sources, perform an anomaly lookup procedure on the one or more data sources within the subset, wherein the anomaly lookup procedure is constrained based on the alert date such that the anomaly lookup procedure initially examines only specific data that was generated within a first time window that is established relative to the alert date in order to determine an initial set of suspicious anomalies; and
refrain from performing the anomaly lookup procedure on any other data sources that are determined to not include the source even if said other data sources generated data during the first time window.

2. The computing system of claim 1, wherein searching all of the plurality of data sources in the attempt to identify said source further comprises differentiating between usable data that is usable by the anomaly lookup procedure and unusable data that is unusable by the anomaly lookup procedure.

3. The computing system of claim 2, wherein a type of the usable data that is useable by the anomaly lookup procedure is one of categorical data or continuous data.

4. The computing system of claim 1, wherein the identifying information for the source comprise one or more of a machine name, a user name, an IP address, or a network identifier.

5. The computing system of claim 1, wherein the computer-executable instructions are structured to further cause the computing system to:
select a second time window, which has a longer time period than a time period of the first time window; and
cause the anomaly lookup procedure to examine particular data that was generated within the second time window to determine if the initial set of suspicious anomalies are of a malicious type or are of a random type.

6. The computing system of claim 1, wherein the computer-executable instructions are structured to further cause the computing system to:
rank the initial set of suspicious anomalies to determine an order at which each of the suspicious anomalies should be investigated further.

7. The computing system of claim 1, wherein the alert date also includes an associated time stamp.

8. The computing system of claim 1, wherein performing the anomaly lookup procedure comprises:
determining a count of the initial set of suspicious anomalies during the first time window; and
comparing the count during the first time window to a count determined during a third time window that is longer than the first time window.

9. The computing system of claim 1, wherein the plurality of data sources include logs from one or more of a specific computer, routers on a network, an application, an operating system, network infrastructure, and cloud computing infrastructure.

10. A method for performing anomaly lookup on a selected subset of data sources, the method comprising:
receiving identifying information for a source that is related to an alert and receiving a date when the alert occurred, wherein the alert is received in response to an anomaly being detected within data collected from a plurality of data sources;
searching all of the plurality of data sources in an attempt to identify said source, wherein the search is limited based on the alert date;
as a part of said search, identifying a subset of one or more data sources from among the plurality of data sources, wherein the one or more data sources within the subset are identified based on a determination that the one or more data sources in the subset do include the source;
for only the subset of the one or more data sources, performing an anomaly lookup procedure on the one or more data sources within the subset, wherein the anomaly lookup procedure is constrained based on the alert date such that the anomaly lookup procedure initially examines only specific data that was generated within a first time window that is established relative to the alert date in order to determine an initial set of suspicious anomalies; and
refraining from performing the anomaly lookup procedure on any other data sources that are determined to not include the source even if said other data sources generated data during the first time window.

11. The method of claim 10, wherein searching all of the plurality of data sources in the attempt to identify said source further comprises differentiating between usable data that is usable by the anomaly lookup procedure and unusable data that is unusable by the anomaly lookup procedure.

12. The method of claim 11, wherein a type of the usable data that is useable by the anomaly lookup procedure is one of categorical data or continuous data.

13. The method of claim 10, wherein the identifying information for the source comprise one or more of a machine name, a user name, an IP address, or a network identifier.

14. The method of claim 10, further comprising:
selecting a second time window, which has a longer time period than a time period of the first time window; and
causing the anomaly lookup procedure to examine particular data that was generated within the second time window to thereby help to determine if the initial set of suspicious anomalies are of a malicious type or are of a random type.

15. The method of claim 10, further comprising:
ranking the initial set of suspicious anomalies to determine an order at which each of the suspicious anomalies should be investigated further.

16. The method of claim 10, wherein the alert date includes an associated time stamp.

17. The method of claim 10, wherein performing the anomaly lookup procedure comprises:
determining a count of the initial set of suspicious anomalies during the first time window; and
comparing the count during the first time window to a count determined during a third time window that is longer than the first time window.

18. The method of claim 10, wherein the plurality of data sources include logs from one or more of a specific computer, routers on a network, an application, an operating system, network infrastructure, and cloud computing infrastructure.

19. A computer system comprising:
one or more processors; and
one or more computer-readable hardware storage devices that store instructions that are executable by the one or more processors to cause the computer system to:
receive identifying information for a source that is related to an alert and receive a date when the alert occurred, wherein the alert is received in response to an anomaly being detected within data collected from a plurality of data sources, wherein the anomaly is related to a non-malicious activity or a malicious activity, and wherein the non-malicious activity includes a power surge;
search all of the plurality of data sources in an attempt to identify said source, wherein the search is limited based on the alert date;
as a part of said search, identify a subset of one or more data sources from among the plurality of data sources, wherein the one or more data sources within the subset are identified based on a determination that the one or more data sources in the subset do include the source;
for only the subset of the one or more data sources, perform an anomaly lookup procedure on the one or more data sources within the subset, wherein the anomaly lookup procedure is constrained based on the alert date such that the anomaly lookup procedure initially examines only specific data that was generated within a first time window that is established relative to the alert data in order to determine an initial set of suspicious anomalies; and
refrain from performing the anomaly lookup procedure on any other data sources that are determined to not include the source even if said other data sources generated data during the first time window.

20. The computer system of claim 19, wherein execution of the instructions further causes the computer system to:
select a second time window, which has a longer time period than a time period of the first time window; and
perform the anomaly lookup procedure to examine particular data that was generated within the second time window to determine if the initial set of suspicious anomalies are of a malicious type or are of a random type.

* * * * *